(12) United States Patent
Okamura et al.

(10) Patent No.: US 8,789,874 B2
(45) Date of Patent: Jul. 29, 2014

(54) FRONT VEHICLE BODY STRUCTURE

(75) Inventors: Jyunya Okamura, Tokyo (JP);
Takehisa Tsukada, Tokyo (JP); Kouichi Imamura, Tokyo (JP); Takatomo Watamori, Tokyo (JP); Shinya Inoue, Tokyo (JP)

(73) Assignees: Fuji Jukogyo Kabushiki Kaisha, Tokyo (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/431,040

(22) Filed: Mar. 27, 2012

(65) Prior Publication Data
US 2012/0248819 A1 Oct. 4, 2012

(30) Foreign Application Priority Data
Mar. 30, 2011 (JP) ................. 2011-074462

(51) Int. Cl.
*B62D 25/08* (2006.01)
*B60R 19/34* (2006.01)

(52) U.S. Cl.
USPC .............. 296/187.09; 296/187.1; 296/203.02; 180/68.4; 293/133

(58) Field of Classification Search
USPC ............. 296/203.01, 203.02, 187.03, 187.09, 296/187.1, 193.09; 293/133, 155; 180/68.4
See application file for complete search history.

(56) References Cited

U.S. PATENT DOCUMENTS

| | | | |
|---|---|---|---|
| 5,271,473 A * | 12/1993 | Ikeda et al. ................... | 180/68.4 |
| 6,634,702 B1 * | 10/2003 | Pleschke et al. ......... | 296/187.04 |
| 7,144,074 B2 | 12/2006 | Lee | |
| 7,516,994 B2 * | 4/2009 | Ito ................................. | 293/133 |
| 7,517,006 B2 * | 4/2009 | Kageyama et al. ....... | 296/187.09 |
| 7,699,383 B2 * | 4/2010 | Fukukawa et al. ........ | 296/187.04 |
| 8,220,576 B2 * | 7/2012 | Terada et al. ................ | 180/68.4 |
| 8,287,036 B2 * | 10/2012 | Nakaura et al. .......... | 296/203.02 |
| 2005/0206200 A1 * | 9/2005 | Tazaki et al. ............. | 296/203.02 |
| 2010/0078149 A1 * | 4/2010 | Yoshimitsu et al. ............ | 165/67 |

FOREIGN PATENT DOCUMENTS

| | | |
|---|---|---|
| CN | 101402373 | 4/2009 |
| JP | 2000-247256 | 9/2000 |
| JP | 2006-76455 | 3/2006 |
| JP | 2008-195094 | 8/2008 |
| JP | 2009-161109 | 7/2009 |
| JP | 4297016 | 7/2009 |
| JP | 2010-132180 | 6/2010 |

* cited by examiner

*Primary Examiner* — Dennis H Pedder
(74) *Attorney, Agent, or Firm* — Smith, Gmabrell & Russell, LLP.

(57) ABSTRACT

There is provided a front vehicle body structure. A radiator panel lower is mounted between front ends of side frames, crash boxes at the front ends of the side frames, and a bumper beam between front ends of the crash boxes. The radiator panel lower includes a bracket offset toward the inside in the vehicle width direction from the side frame. Upon an offset front collision, a shock load is absorbed by an axial compression deformation of one of the crash boxes and a drag of the side frames. Upon a full-overlap front collision, the right and left crash boxes are subjected to the axial compression deformation, and the shock load is input to the bracket, thereby bending the side frames. Accordingly, and a sufficient axial compression deformation of the crash boxes is secured, and the shock load is absorbed by the reduction in the drag of the side frames.

24 Claims, 6 Drawing Sheets

FRONT VEHICLE BODY STRUCTURE

CROSS-REFERENCE TO RELATED APPLICATIONS

The present application claims priority from Japanese Patent Application No. 2011-074462 filed on Mar. 30, 2011, the entire contents of which are hereby incorporated by reference.

BACKGROUND OF THE INVENTION

1. Field of the Invention

The present invention relates to a front vehicle body structure, and more particularly, to a front vehicle body structure in which a radiator panel lower extending in a width direction of a vehicle is mounted between front ends of right and left side frames extending in a longitudinal direction of the vehicle body, and a bumper extending in the width direction of the vehicle is mounted at the front ends of the right and left side frames via a shock absorbing member.

2. Description of Related Art

A strength and rigidity of a vehicle body is required to minimize a deformation of a vehicle compartment, which is a living space of a passenger, so that safety of the passenger for a crash of the vehicle is secured. In the case of a front collision, a front part of the vehicle is deformed as a crash zone so as to absorb a shock load, whereby a shock caused to the vehicle compartment, which is located at the rear of the front part, is reduced to decrease an injury criterion to which the passenger is exposed.

There has been known the following structure as the vehicle front body structure of this type. Specifically, the structure includes a radiator panel lower between front ends of right and left side frames, and shock absorbing members that are provided at the front ends of the right and left side frames, and that are subjected to an axial compression plastic deformation due to a shock load in an amount not less than a predetermined value input to the front ends of the right and left side frames. Further, a bumper is provided between the front ends of the right and left shock absorbing members.

For example, Japanese Patent Application Laid-Open (JP-A) No. 2006-76455 describes a structure whose side view is illustrated in FIG. 5. Specifically, a radiator panel lower 102 extending in the width direction of the vehicle is provided between front ends of right and left side frames 101 extending in the longitudinal direction of the vehicle, and crash boxes 103 serving as a shock absorbing member are coaxially provided to the front ends of the right and left side frames 101. The crash boxes 103 are subjected to an axial compression plastic deformation, when a shock load in an amount not less than a predetermined value is input to the front ends of the right and left side frames 101. A front bumper reinforce 104 extending in the width direction of the vehicle is mounted between the front ends of the right and left crash boxes 103.

Further, right and left second members 106 extending in the longitudinal direction are disposed below the right and left side frames 101. The rear ends of the second members 106 are coupled to front ends of sub-frames 105. The front ends of the second members 106 are coupled to each other by a bumper reinforce 107 disposed substantially parallel to the front bumper reinforce 104. The second members 106 are sandwiched between a lower end of a vertical column 109 of the radiator panel 108 and the radiator panel lower 102, and, with this state, they are coupled to the vertical column 109 and the radiator panel 102.

When the front vehicle part hits a side face of another vehicle, the bumper reinforce 107 is brought into contact with a side sill of the other vehicle. When the shock load is input to the second members 106 through the bumper reinforce 107, the second members 106 are deformed by an axial compression, thereby absorbing the shock load. On the other hand, when the shock load is input from a front bumper reinforce 104 to the side frame 101, the crash box 103 on the crash side is deformed by the axial compression, thereby absorbing the shock load.

(JP-A No. 2008-195094 describes another structure, whose perspective view is illustrated in FIG. 6. A frame-like sub-frame 115 is disposed below right and left side frames 111 extending in the longitudinal direction of the vehicle body, the frame-like sub-frame 115 including a pair of right and left vertical members 116 extending in the longitudinal direction of the vehicle body, and a front lateral member 117 and a rear lateral member 118 that extend in the width direction of the vehicle for linking front and rear ends of the vertical members 116. Both right and left front ends of the sub-frame 115 are supported by a pair of right and left linking members 112 projecting downward from the bottom surfaces of the front ends of the side frames 111, while the right and left rear ends are supported by kick-up units that are bent downward at the rear of the side frames 111.

A pair of right and left lower radiator support brackets 119 for supporting the lower part of the radiator is provided, the lower radiator support brackets 119 projecting from the front lateral member 117 of the sub-frame 115 toward the front of the vehicle body. A radiator upper stay 121 that supports an upper part of the radiator is provided between upper ends of radiator side stays 120 projecting from the front ends of the side frames 111.

With this structure, when a front collision occurs, the shock load input to the lower radiator support brackets 119 is directly transmitted to the sub-frame 115 from the front lateral member 117, whereby the shock absorbing efficiency of the sub-frame 115 can be enhanced, and a large-sized radiator can be mounted.

According to JP-A No. 2006-76455, when the front part of the vehicle body hits a side face of another vehicle, the bumper reinforce 107 is brought into contact with a side sill of the other vehicle. When the shock load is input to the second members 106 through the bumper reinforce 107, the second members 106 are deformed by an axial compression, thereby absorbing the shock load. On the other hand, when the shock load is input from the front bumper reinforce 104 to the side frame 101, the crash box 103 on the crash side is deformed by the axial compression, thereby absorbing the shock load.

In the case of full-overlap front collision in which a whole front part of a vehicle body collides against a concrete barrier or the like at a substantially right angle, the shock load is transmitted so as to be distributed to the right and left crash boxes 103 through the front bumper reinforce 104 and to the right and left second members 106 through the bumper reinforce 107, whereby the shock load is absorbed by the axial compression deformation of the right and left crash boxes 103 and the right and left second members 106.

On the other hand, in the case of an offset front collision in which a part of the front part of the vehicle body collides against the concrete barrier or the like, the shock load is transmitted to one of the crash boxes 103 through the front bumper reinforce 104 and to one of the second members 106 through the bumper reinforce 107. Therefore, shock load that is larger than the one expected in the case of the full-overlap collision is transmitted to the crash box 103 and the second member 106. Accordingly, the axial compression deformation that is larger than the one in the case of the full-overlap front collision is caused in the crash box 103 and the second member 106.

Consequently, in order to optimize the rigidity and strength of the crash boxes 103 and the second members 106 with the offset front collision being defined as a reference, the rigidity and strength of the right and left crash boxes 103 and the second members 106 have to be set significantly higher. When an offset front collision occurs in a vehicle provided with the crash boxes 103 and the second members 106, which are set with the offset front collision being defined as a reference, the shock load can be efficiently absorbed by the axial compression deformation of only one of the crash boxes 103 and one of the second members 106.

On the other hand, when the full-overlap front collision occurs in the vehicle provided with the crash boxes 103 and the second members 106 having the rigidity and strength set with the offset front collision being defined as a reference, the shock load is transmitted so as to be distributed to the right and left crash boxes 103 and the right and left second members 106. The crash boxes 103 and the second members 106, having the rigidity and strength set high, are deformed in a small amount, resulting in that the shock load cannot sufficiently be absorbed, and the remaining shock load might increase.

Similarly, in JP-A No. 2008-195094, in the case of the full-overlap front collision, the shock load is transmitted to the sub-frame 115 so as to be distributed to the right and left lower radiator support brackets 119 from the front lateral member 117, whereby the shock load is absorbed.

On the other hand, in the case of the offset front collision, the shock load is transmitted to the sub-frame 115 from one of the lower radiator support brackets 119 through the front lateral member 117, so that the shock load larger than the one expected in the case of the full-overlap front collision is transmitted to the sub-frame 115 from one of the lower radiator support brackets 119. Therefore, deformation larger than the one in the case of the full-overlap front collision is generated.

Accordingly, in order to optimize the rigidity and strength with the offset front collision being defined as a reference, the rigidity and strength of the sub-frame 115 and the other members have to be set significantly higher. When an offset front collision occurs in a vehicle provided with the members, which are set with the offset front collision being defined as a reference, the shock load can efficiently be absorbed by the deformation of the sub-frame 115.

On the other hand, when the full-overlap front collision occurs in the vehicle provided with the members set with the offset front collision being defined as a reference, the shock load is transmitted to the sub-frame 115 through the front lateral member 117 so as to be distributed to the right and left lower radiator support brackets 119. The sub-frame 115, having the rigidity and strength set high with the offset front collision being defined as a reference, is deformed in a small amount, resulting in that the shock load cannot sufficiently be absorbed, and the remaining shock load might increase.

BRIEF SUMMARY OF THE INVENTION

In view of the foregoing problems, the present invention aims to provide a front vehicle body structure that can effectively absorb a shock load by a front vehicle body part in a full-overlap front collision and an offset front collision.

A front vehicle body structure according to a first aspect of the present invention for attaining the foregoing purpose, comprises: right and left side frames extending in a longitudinal direction of a vehicle body; a radiator panel lower mounted between front ends of the right and left side frames; shock absorbing members that are provided at front ends of the right and left side frames, configured to be subjected to an axial compression deformation when a shock load not less than a predetermined value is input; and a bumper beam mounted between front ends of the right and left shock absorbing members. The front vehicle body structure further comprises shock load input units provided at positions below the bumper beam, the shock load input units being offset inwardly, with respect to a widthwise direction of the vehicle, from a center axis of the side frames on the radiator panel lower, and projecting from the radiator panel lower in a frontal direction of the vehicle body.

With this structure, the radiator panel lower is mounted between front ends of the right and left side frames. The shock absorbing members that are subjected to an axial compression deformation and are mounted at the front ends of the side frames. The bumper beam is mounted between front ends of the shock absorbing members. The shock load input unit that projects toward the front of the vehicle body is provided below the bumper beam at the position offset toward the inside in the width direction of the vehicle from the center axis of the side frames on the radiator panel lower. Accordingly, when the front vehicle body part collides with a shock load not less than a predetermined value, the shock load is input to one of the shock absorbing member through the bumper beam, and the shock load is absorbed by the axial compression deformation of the shock absorbing member.

In the case of a full-overlap front collision in a vehicle not provided with the shock load input unit, the shock load is transmitted as distributed to the right and left shock absorbing members through the bumper beam. On the other hand, in the case of the offset front collision, the shock load is input to the corresponding one of the shock absorbing members through the bumper beam, so that the shock load greater than that in the case of the full-overlap collision is transmitted to the shock absorbing members and the side frames.

In the vehicle body front structure provided with the shock load input unit according to the first aspect of the present invention, shock absorbing members having relatively large rigidity and strength are set as the shock absorbing members in order to cope with the offset front collision. With this structure, in the case of the offset front collision in which only a part of the vehicle body front collides, the shock load can efficiently be absorbed by the axial compression deformation of one of the shock absorbing members, the drag of the side frames and the like. On the other hand, in the case of the full-overlap front collision, the shock load is transmitted so as to be distributed to the right and left shock absorbing members through the bumper beam. Therefore, the right and left shock absorbing members are deformed by the axial compression, and the shock load is input from the front to the right and left shock load input units provided so as to project from the radiator panel. Accordingly, the side frames are bent through the radiator panel lower. Thus, even in the shock absorbing members having relatively large rigidity and strength, a sufficient amount of the axial compression deformation is secured, and an effective shock load absorbing property can be attained by the reduction in the drag of the side frames. In other words, the shock load can effectively be absorbed at the vehicle body front in the full-overlap front collision and in the offset front collision.

Preferably, the radiator panel lower comprises a radiator panel lower body extending in the width direction of the vehicle which has a closed cross-section having a front surface, a top surface, a rear surface, and a bottom surface, both ends of the radiator panel lower body being connected to the lower surfaces of the front ends of the right and left side frames and mounting bases that are connected to the both ends of the radiator panel lower body and the front ends of the right and left side frames.

It is preferable that each of the shock load input units is a columnar member that extends frontward, the rear ends of the shock load input units being fixed to the front surface of the radiator panel lower body at positions offset inwardly, with respect to the widthwise direction of the vehicle, from the center axis of the side frame.

The columnar member serving as the shock load input unit is mounted on the front surface of the radiator panel lower body as being offset toward the inside in the width direction of the vehicle with respect to the center axis of the side frame. With this structure, when the shock load not less than a predetermined value is input from the front to the columnar member, the load is effectively transmitted to the radiator panel body, whereby the front ends of the side frames can be bent through the radiator panel lower body and the mounting bases.

Preferably, the radiator panel lower comprises a radiator panel lower body extending in the width direction of the vehicle which has a closed cross-section having a front surface, a top surface, a rear surface, and a bottom surface, both ends of the radiator panel lower body being connected to the lower surfaces of the front ends of the right and left side frames, and mounting bases that are connected to both ends of the radiator panel lower body and the front ends of the right and left side frames and the rear ends of the shock load input units being fixed to the front surface of the radiator panel lower body at positions offset inwardly, with respect to the widthwise direction of the vehicle, from the center axis of the side frame. It is preferable that each of the shock load input units is configured as a bracket in the form of a hollow column, the bracket comprising an upper member having a front end, a top surface and side faces downwardly extending from folding lines at both sides of the top surface, and a lower member having a front end, a rear end, both sides, and a contact area upwardly extending from the front end, the rear end being fixed to the front surface of the radiator panel lower body, the both sides being connected to edges of the both side of the upper member, the contact area being formed so as to cover the front end of the upper member.

The bracket serving as the shock load input unit is mounted on the front surface of the radiator panel lower body as being offset toward the inside in the width direction of the vehicle with respect to the center axis of the side frame. With this structure, when the shock load not less than a predetermined value is input from the front to the bracket, the load is effectively transmitted to the radiator panel body, whereby the front ends of the side frames can be bent through the radiator panel lower body and the mounting bases. The bracket also includes an upper member having a top surface, which has a rear end fixed to the front surface of the radiator panel lower, and a side face that is bent downward on folding lines at both sides, and a lower member having a plate-like shape, having a rear end fixed to the front surface of the radiator panel body, having both sides connected to both side edges of the upper member, and having a contact area that is formed at a front end as being bent so as to cover the front end of the upper member. Therefore, the bracket is light-weight, and the rigidity in the axial direction can be secured.

Preferably, weak areas should be formed in the vicinity of the front ends of the side frames.

The weak areas are formed in the vicinity of the front ends of the side frames, whereby the side frames are stably bent.

According to the present invention, in the case of the offset front collision, the shock load can efficiently be absorbed by the axial compression deformation of one of the shock absorbing members and the drag of the side frames. On the other hand, in the case of the full-overlap front collision, the shock load is transmitted so as to be distributed to the right and left shock absorbing members through the bumper beam. Therefore, the right and left shock absorbing members are deformed by the axial compression, and the shock load is input from the front to the right and left shock load input units. Accordingly, the side frames are bent, whereby the sufficient amount of the axial compression deformation is secured, and the effective shock load absorbing property can be attained by the reduction in the drag of the side frames. In other words, the shock load can be effectively absorbed at the vehicle body front in the full-overlap front collision and in the offset front collision.

DETAILED DESCRIPTION OF THE INVENTION

An embodiment of a front vehicle body structure according to the present invention will be described with reference to FIGS. 1 to 4.

Figure 1:
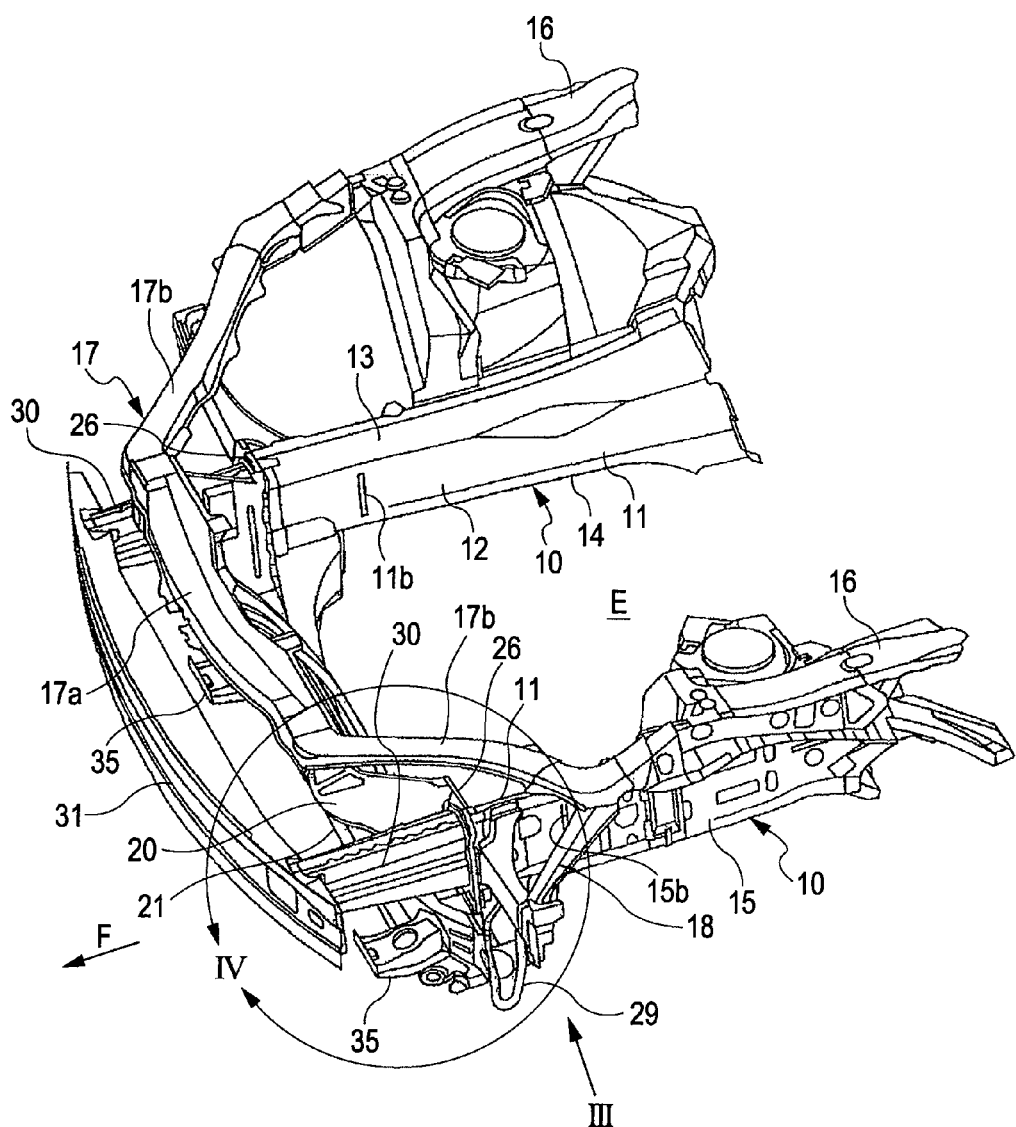
FIG. 1 is a perspective view of a front vehicle body structure illustrating an outline of an embodiment of the present invention.
Figure 2:
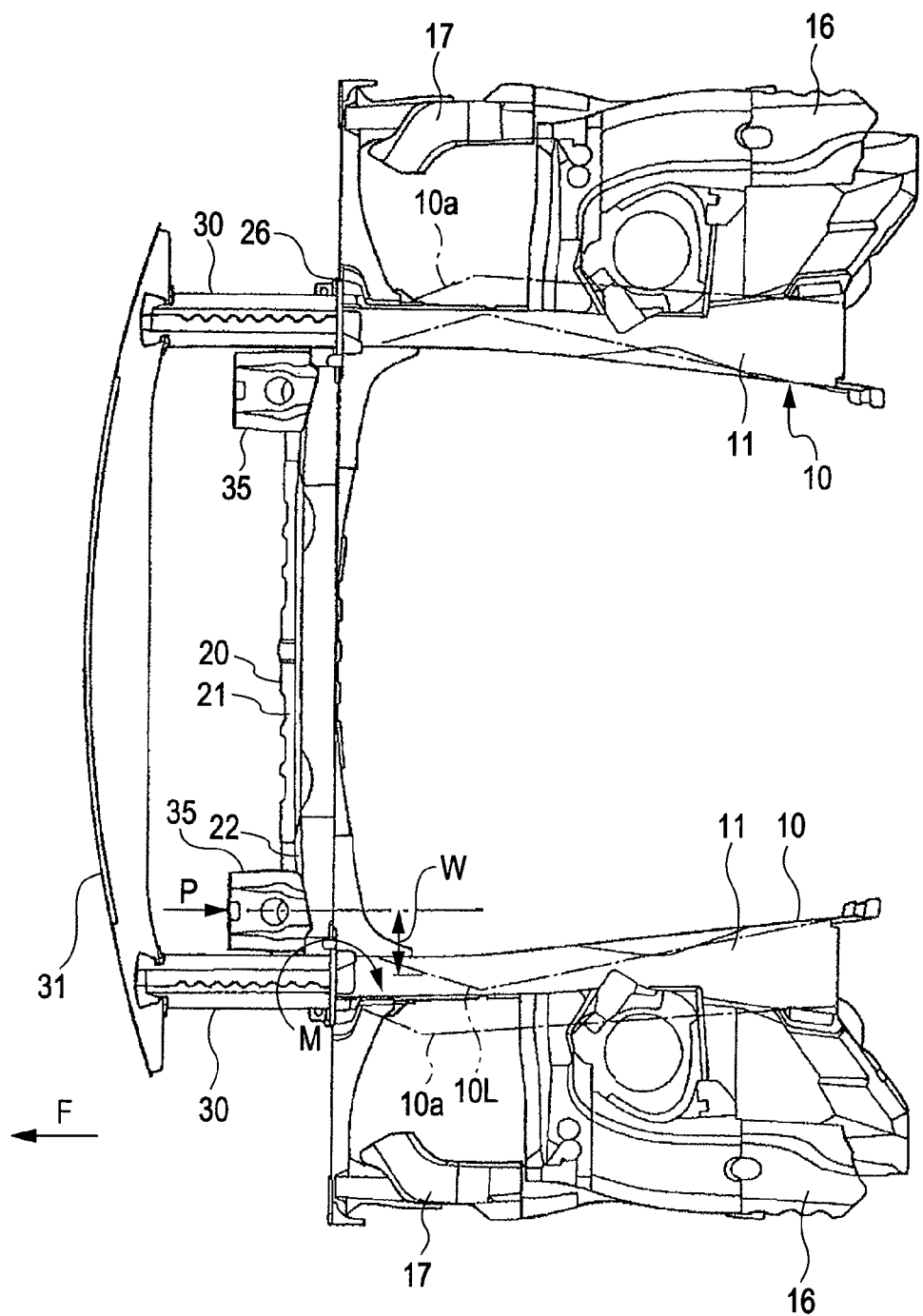
FIG. 2 is a plan view of FIG. 1, wherein a radiator panel upper is not illustrated.
Figure 3:
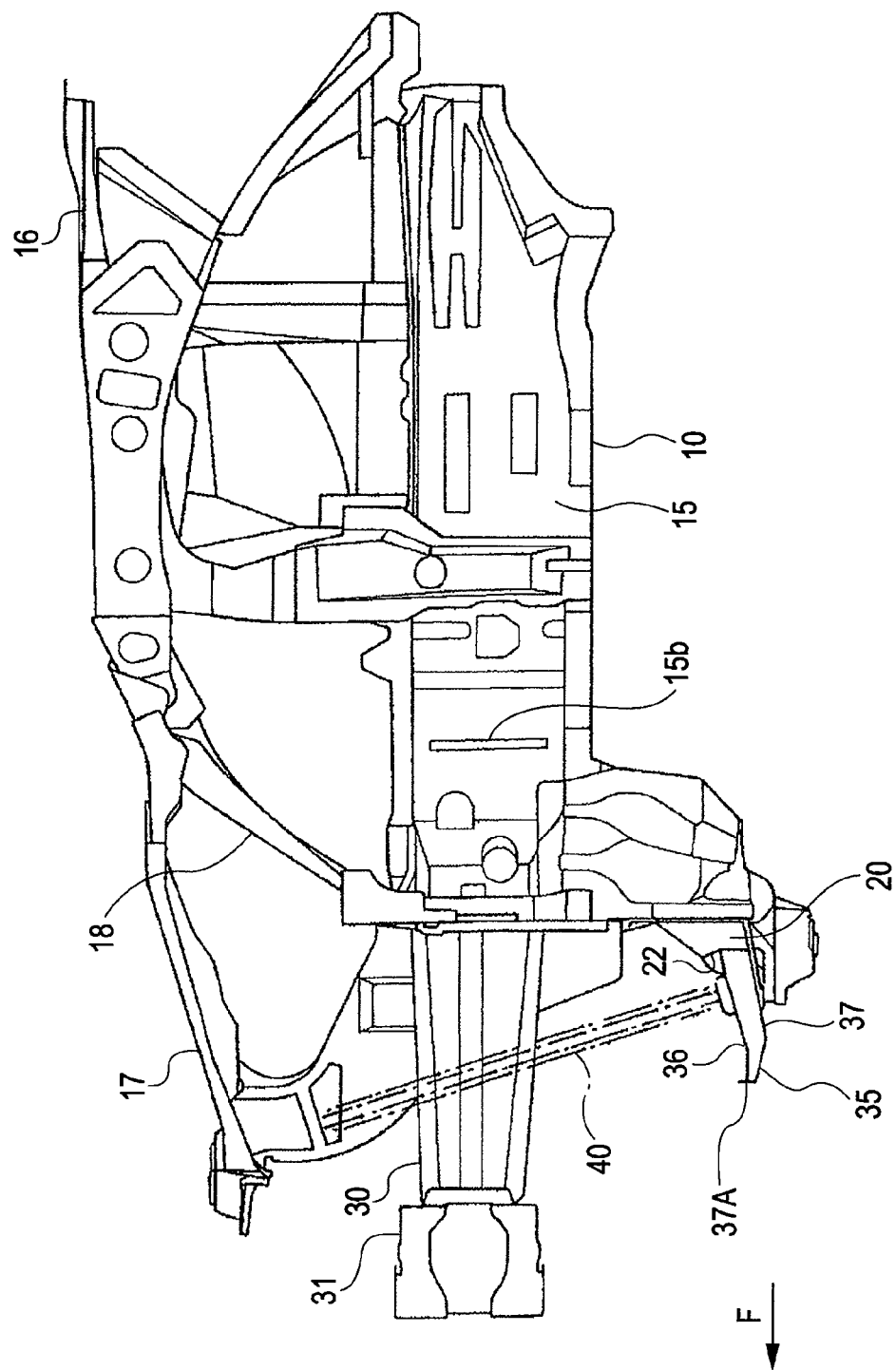
FIG. 3 is a view seen from an arrow III in FIG. 1.
Figure 4:
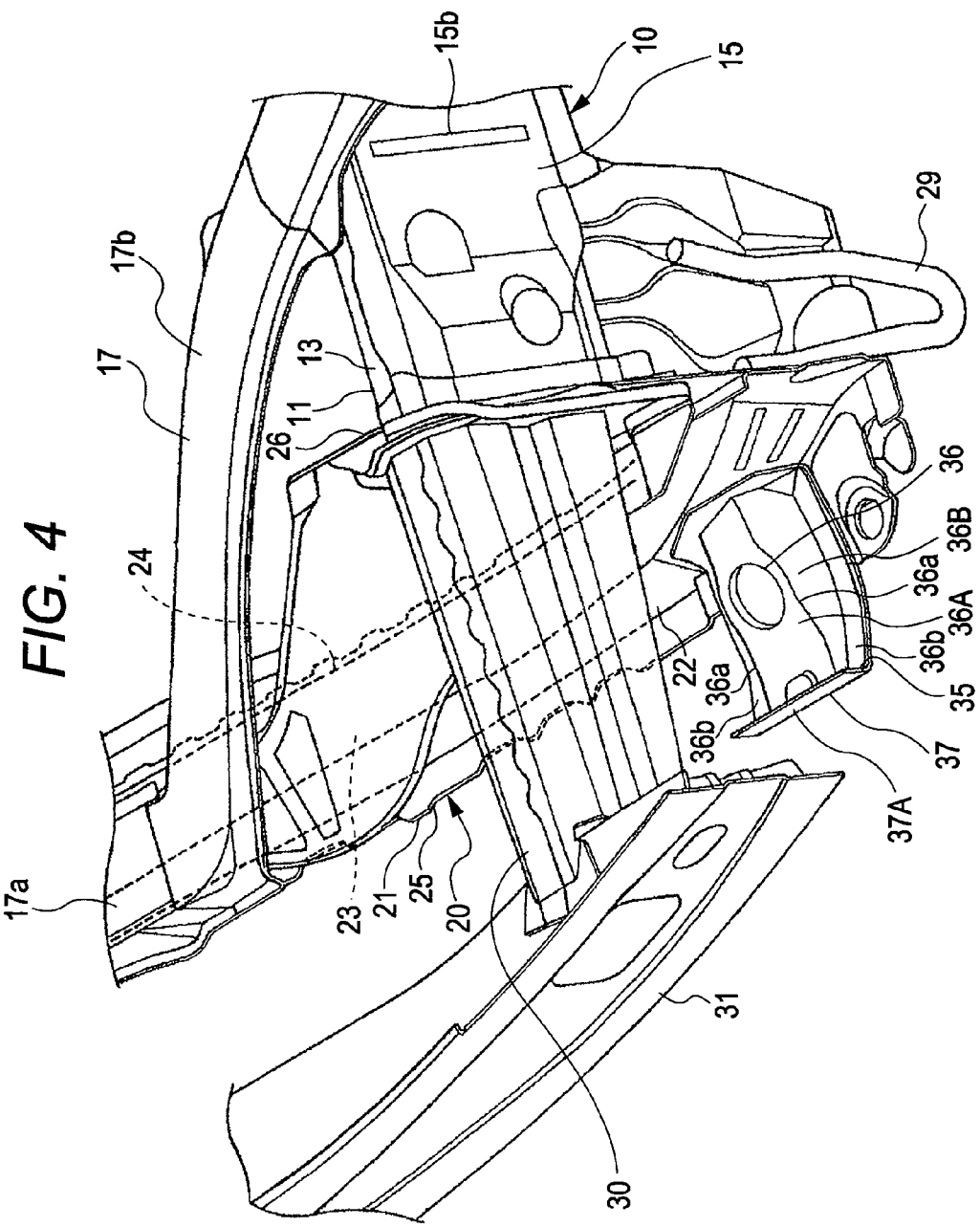
FIG. 4 is a partially enlarged view of IV area in FIG. 1.
Figure 5:
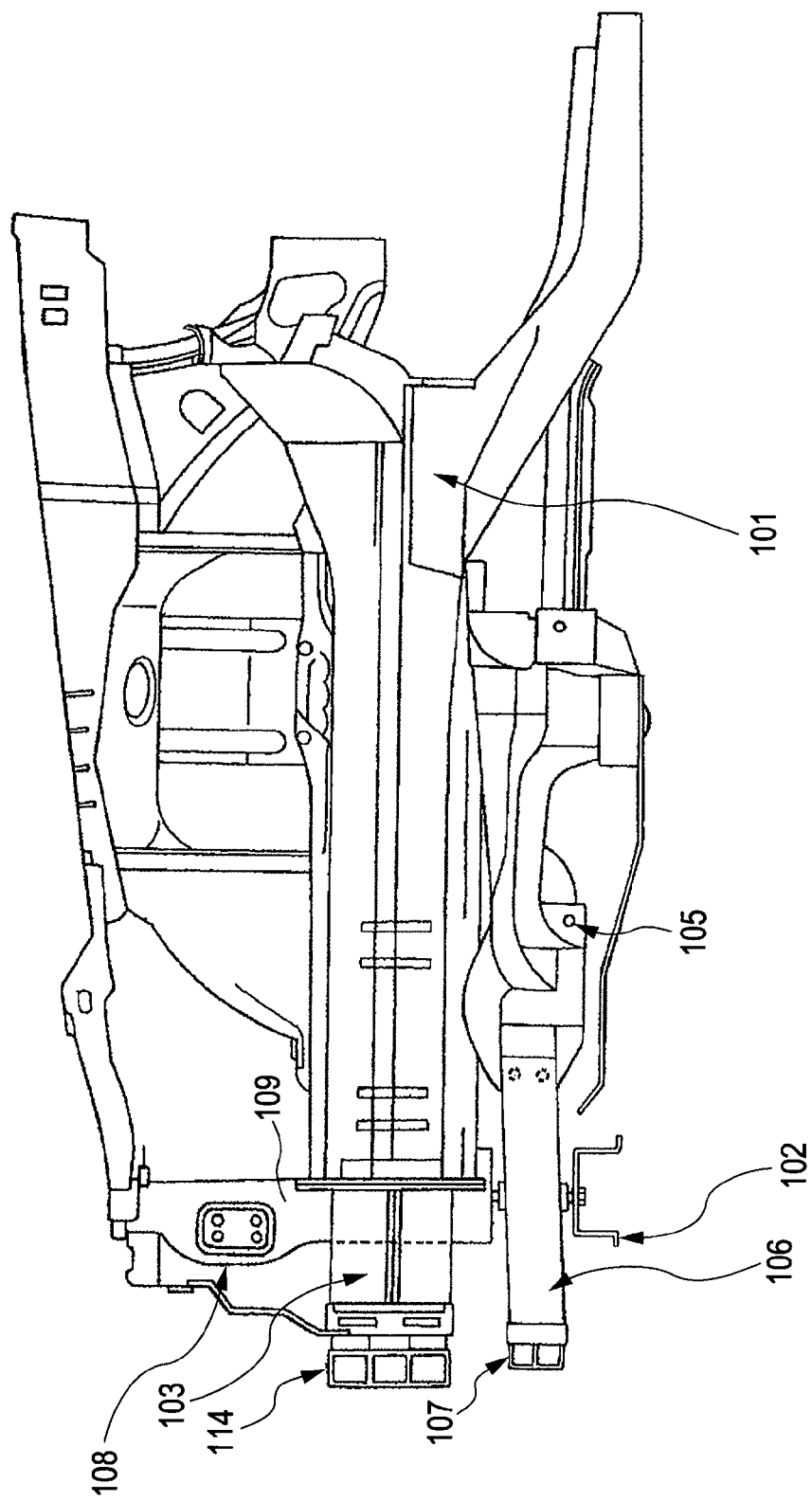
FIG. 5 is a side view illustrating an outline of a conventional front vehicle body structure.
Figure 6:
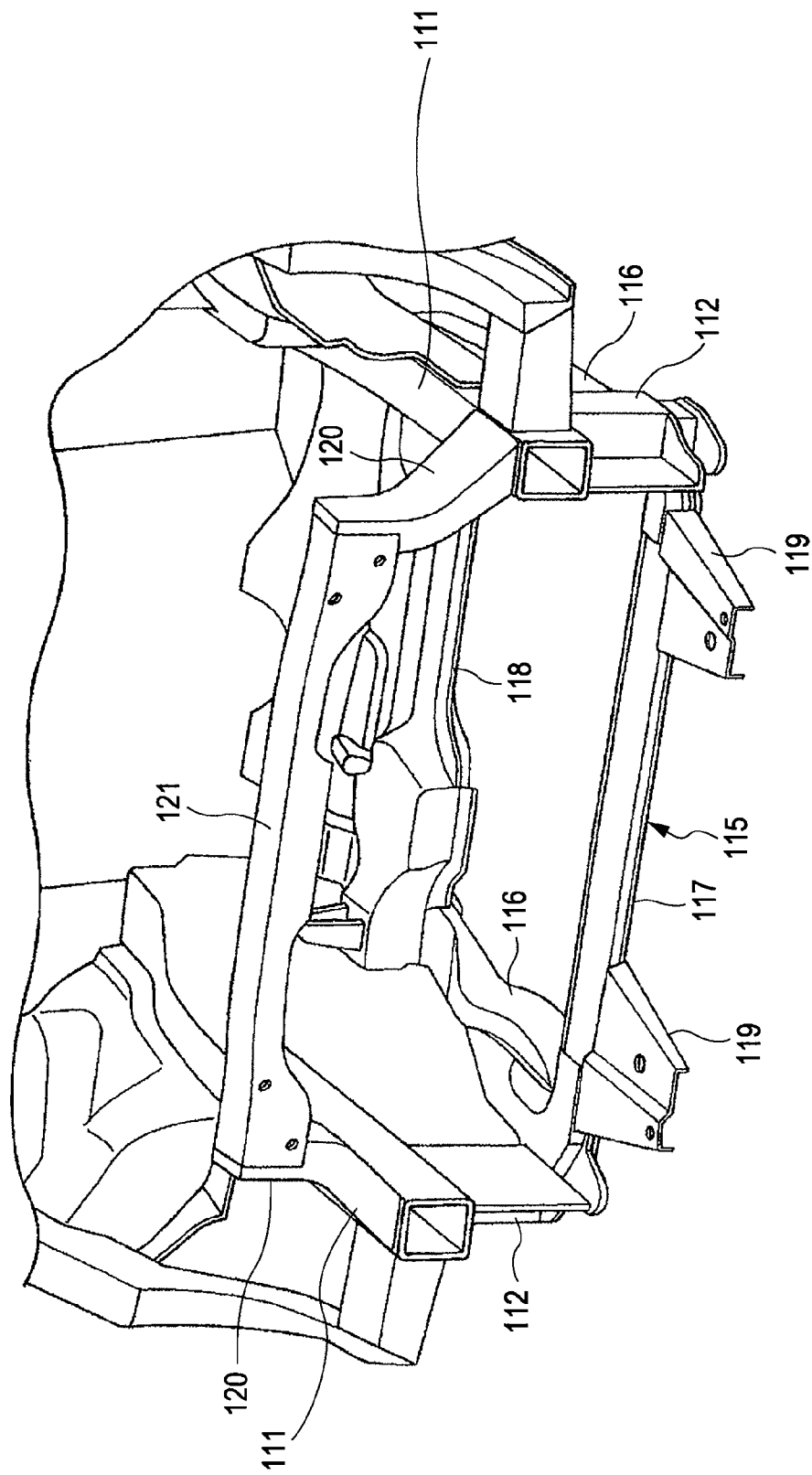
FIG. 6 is a perspective view illustrating an outline of a conventional front vehicle body structure.

FIG. 1 is a perspective view illustrating an outline of the front vehicle body structure, FIG. 2 is a plan view of FIG. 1, wherein a radiator upper panel is not illustrated, FIG. 3 is a view seen from an arrow III in FIG. 1, and FIG. 4 is a partially enlarged view of IV area in FIG. 1. An arrow F in the figure indicates a forward direction of the vehicle body.

Right and left side frames 10 extending in a longitudinal direction of the vehicle body are disposed at a front part of the vehicle body. Rear ends of the side frames 10 are coupled to a toe board that defines an engine room E and an unillustrated vehicle compartment, or front pillars. The side frames 10 include upper frames 16 extending toward the front part of the vehicle body from front ends of the right and left front pillars. The front ends of the right and left upper frames 16 are coupled at a central range in the width direction of the vehicle by a radiator panel upper 17 including a front portion 17a extending in the width direction of the vehicle and side portions 17b that are curved from both ends of the front portion 17a so as to be apart from each other toward the rear part of the vehicle body. The vicinity of a front end of the side frame 10 and a front end of the upper frame 16 are coupled by a linking member 18.

Each of the right and left side frames 10 extends along the longitudinal direction of the vehicle body with substantially a rectangular closed section by an inner panel 11, extending in the longitudinal direction of the vehicle body, and an outer panel 15. The inner panel 11 has a substantially U-shaped cross section, and includes an inner side face 12 at the inside in the width direction of the vehicle, and a top surface 13 and a bottom surface 14 that are formed to be curved outward in the width direction of the vehicle along an upper edge and a lower edge of the inner side face 12. The upper edge and lower edge of the outer panel 15 are coupled to a flange, which is formed as curved at the edges of the top surface 13 and the bottom surface 14 of the inner panel 11.

The right and left side frames 10 are arranged so as to be slightly tilted in the width direction of the vehicle with respect to the longitudinal direction of the vehicle, i.e., with respect to the axial direction of the vehicle body, such that they are gradually apart from each other from the rear end part near the vehicle compartment toward the front end part. A weak area is formed in the vicinity of the front end by a deformation-inducing bead 11b that is formed on the inner side face 12 of the inner panel 11 and that extends in the vertical direction, and a deformation-inducing bead 15b that is formed on the outer panel 15 and extends in the vertical direction. The rigidity of the weak area is suppressed in the bending direction.

A radiator panel lower 20 extending in the width direction of the vehicle is mounted between the front ends of the right and left side frames 10. The radiator panel lower 20 includes a radiator panel lower body 21 and mounting bases 26. Both ends of the radiator panel body 21 are coupled to the bottom surface at the front ends of the right and left side frames 10. The radiator panel lower body 21 has a closed section and includes a front surface 22, a top surface 23, a rear surface 24, and a bottom surface 25, the surfaces extending in the width direction of the vehicle. The mounting bases 26 are coupled to both ends of the radiator panel lower body 21, and coupled to the whole circumference of the front ends of the right and left side frames 10. A tie-down hook 29 is provided at a side end of the radiator panel lower 20. Since the tie-down hook 29 does not directly relate to the present invention, the description thereof is omitted.

Crash boxes 30 having a substantially rectangular cylindrical shape are mounted to the front ends of the right and left side frames 10 so as to be coaxial with the side frames 10 through the mounting bases 26 of the radiator panel lower 20. When a shock load not less than a predetermined value is input from front, the crash boxes 30 are plastically deformed by an axial compression, and absorb the shock load. The front ends of the right and left crash boxes 30, serving as shock load absorbing members, are coupled to each other by a bumper beam 31 extending in the width direction of the vehicle. The bumper beam 31 is a strength member constituting a part of the front bumper. A bumper face serving as a shock relaxation member and a resinous epidermis material is mounted on its front.

Brackets 35 for inputting the shock load are provided in the vicinity of both ends of the front surface 22 of the radiator panel lower body 21 and at a position offset by an amount of W toward the inside in the width direction of the vehicle from a center axis 10L of the side frame 10. The brackets 35 project toward the forward direction of the vehicle body. As illustrated in FIG. 4, each of the brackets 35 is formed into a hollow columnar shape by an upper member 36 and a lower member 37. The upper member 36 includes a top surface 36A having a rear end fixed to the front surface 22 of the radiator panel lower body 21, extending toward the front, and formed into a rectangular plate-like shape, side faces 36B bent downward from folding lines 36a at both side edges, and flanges 36b formed to be bent at both side edges. The upper member 36 has a hat-like cross section, and extends toward the front. The lower member 37 has a plate-like shape, and the rear end thereof is fixed to the front surface 22 of the radiator panel body 21, and both sides are connected to the flanges 36b of the upper member 36. A front end of the lower member 37 is bent upward so as to form a contact area 37A that covers the front end of the upper member 36. With this structure, the brackets 35 can be made light-weight, and the rigidity in the axial direction can be secured. The contact area 37A of each of the brackets 35 is disposed at the rear of the vehicle body from the bumper beam 31, and below the bumper beam 31. Specifically, each of the brackets 35 is held at a position where it is not in contact with a concrete barrier against an offset front collision.

The hollow columnar brackets 35 serving as the shock load input unit are arranged on the front surface 22 of the radiator panel lower body 21 in such a manner that the brackets 35 are offset by the amount of W toward the inside in the width direction of the vehicle with respect to the center axis 10L of the side frames 10. Therefore, when a shock load not less than the predetermined amount is input to the contact area 37A, which is the leading end of the bracket 35, from front, i.e., when an axial force P is input in the axial direction of the bracket 35 as illustrated in FIG. 2, the load is transmitted to the front surface 22 of the radiator panel body 21, whereby the radiator panel body 21 is bent or curved in an inward-folded manner. A moment load M is applied to the front ends of the side frames 10 to which the radiator panel lower 20 is connected via the radiator panel lower body 21, and the weak area formed of the beads 11b and 15b is bent outward so as to project toward the outer side in the width direction of the vehicle as indicated by a virtual line 10a, i.e., the side frames 10 are controlled to be in a so-called outward-folding mode.

The radiator 40 extends in the width direction of the vehicle along the rear surface of the bumper beam 31, and is disposed between the right and left crash boxes 30 and between the front portion 17a of the radiator panel upper 17 and the radiator panel lower body 21 of the radiator panel lower 20. The upper portion of the radiator 40 is supported by the radiator panel upper 17, while the lower portion thereof is supported by the radiator panel lower 20.

The operation and effect of the front vehicle body structure thus configured will next be described.

When the front vehicle body part collides against a concrete barrier or the like with a shock not less than a predetermined value, i.e., when the bumper abuts against the concrete barrier, for example, the shock load is input to the crash boxes 30 through the bumper beam 31, whereby the crash boxes 30 are deformed with the axial compression, thereby absorbing the shock load.

In the case of the offset front collision in which only a part of the front part of the vehicle body collides against the concrete barrier, the shock load is input to a corresponding one of the crash boxes 30 through the bumper beam 31, and the shock load is transmitted to one of the side frames 10 through the crash box 30. Therefore, the shock load that is remarkably larger than the shock load that is expected in the case of the full-overlap collision is transmitted to the one of the crash boxes 30 and the one of the side frames 10. Accordingly, in order to optimize the rigidity and strength of the crash boxes 30 with the offset front collision being defined as a reference, the rigidity and strength of the right and left crash boxes 30 have to be set significantly higher, compared to the case where the full-overlap front collision is defined as the reference. Specifically, when the offset front collision occurs in the vehicle provided with the crash boxes 30, which are set with the offset front collision being defined as a reference, the shock load can efficiently be absorbed by the axial compression deformation of one of the crash boxes 30 and the drag of the side frames 10. When the rigidity and strength of the crash boxes 30 are set to those set with the offset front collision, and the drag of the side frames 10 is set, an acceleration G of the vehicle in the deceleration can be reduced so as to reduce an injury criterion to which a passenger is exposed.

In the case of the full-overlap front collision in which the whole front part of the vehicle body collides against the concrete barrier at an substantially right angle, the shock load is transmitted so as to be distributed to the right and left crash boxes 30 through the bumper beam 31, whereby the axial compression deformation of the right and left crash boxes 30 occurs. The contact areas 37A of the right and left brackets 35 provided so as to project from the radiator panel lower body 21 abut against the concrete barrier, and the shock load is input from front to the contact areas 37A. Therefore, the radiator panel lower body 21 is bent or curved in the inward-folding manner, and the moment load M is applied to the front ends of the side frames 10 through the radiator panel lower body 21 and the mounting bases 26. With the moment load M, the weak areas formed by the beads 11b and 15b at the front ends of the side frames 10 are bent so as to project toward the outer side in the width direction of the vehicle.

With the bent at the front ends of the side frames 10, the coaxiality among the center of the axis of the crash boxes 30, the inputting direction of the load input from the bumper beam 31, and the direction of the drag of the side frames 10 is broken, and hence, the balanced support of the crash boxes 30 due to the drag of the side frames 10 is broken. Therefore, even if a relatively small shock load is applied upon the full-overlap front collision being defined as a reference, the axial compression deformation of the crash boxes 30, which have the rigidity and strength set with the offset front collision being defined as a reference, can be generated. The effective absorbing characteristic of the shock load can be achieved by the axial compression deformation of the crash boxes 30 and the drag of the side frames 10. Further, the acceleration G of the vehicle in the deceleration can be reduced, and the shock load can be absorbed, while easing the shock transmitted to the vehicle compartment at the rear part. In other words, the acceleration G of the vehicle in the deceleration can be reduced, whereby the injury criterion to which the passenger is exposed can be reduced.

According to the present embodiment, the front ends of the side frames 10 are bent. Therefore, even by the crash boxes 30 having the rigidity and strength set with the offset front collision being defined as a reference, the axial compression deformation of the crash boxes 30 can be generated by the relatively small shock load with the full-overlap front collision being defined as a reference, whereby the shock load can effectively be absorbed. With this structure, in the case of the offset front collision in which only a part of the front vehicle body portion collides against the concrete barrier, the shock load can efficiently be absorbed by the axial compression deformation of the crash boxes 30, which have the rigidity and strength optimally set with the offset front collision being defined as a reference, and the drag of the side frames 10. In the case of the full-overlap front collision, the side frames 10 are bent and deformed by the shock load, whereby the shock load can effectively be absorbed by the amount of the axial compression deformation of the crash boxes 30 and the reduction in the drag of the side frames 10.

The present invention is not limited to the aforesaid embodiment, and various modifications are possible without departing from the scope of the present invention. For example, the weak areas are formed on the side frames 10 by the deformation-inducing beads 11b and 15b in the present embodiment. However, the shape, number, and the mounting position of the beads 11b and 15b can appropriately be changed. The shock load input unit disposed on the front surface 22 of the radiator panel lower body 21 is composed of the hollow columnar brackets 35 including the upper member 36 and the lower member 37. However, the shock load input unit can be composed of various members, such as a resinous member of a cylinder or column whose leading end is closed.

The invention claimed is:

1. A front vehicle body structure comprising:
    right and left side frames extending in a longitudinal direction of a vehicle body, the side frames having front ends with lower surfaces;
    a radiator panel lower mounted between front ends of the right and left side frames;
    right and left shock absorbing members that are provided at the front ends of the right and left side frames, configured to be subjected to an axial compression deformation when a shock load equal to or more than a predetermined value is input;
    a bumper beam mounted between front ends of the right and left shock absorbing members; and
    shock load input units provided on the radiator panel lower at positions below and rearward of the bumper beam, the shock load input units being closed cross-section columnar members that are offset inwardly, with respect to a widthwise direction of the vehicle, from a center axis of the side frames on the radiator panel lower, and projecting from the radiator panel lower in a frontal direction of the vehicle body.

2. The front vehicle body structure according to claim 1, wherein
    the radiator panel lower comprises:
        a radiator panel lower body extending in the width direction of the vehicle which has a closed cross-section having a front surface, a top surface, a rear surface, and a bottom surface, both ends of the radiator panel lower body being connected to the lower surfaces of the front ends of the right and left side frames, and
        mounting bases that are connected to both ends of the radiator panel lower body and the front ends of the right and left side frames; and
    each of the shock load input units extends frontward, the rear ends of the shock load input units being fixed to the front surface of the radiator panel lower body at positions offset inwardly, with respect to the widthwise direction of the vehicle, from the center axis of the side frame.

3. A front vehicle body structure comprising:
    right and left side frames extending in a longitudinal direction of a vehicle body, the side frames having front ends with lower surfaces;
    a radiator panel lower mounted between front ends of the right and left side frames;
    right and left shock absorbing members that are provided at the front ends of the right and left side frames, configured to be subjected to an axial compression deformation when a shock load equal to or more than a predetermined value is input;
    a bumper beam mounted between front ends of the right and left shock absorbing members; and
    shock load input units provided at positions below the bumper beam, the shock load input units being offset inwardly, with respect to a widthwise direction of the vehicle, from a center axis of the side frames on the radiator panel lower, and projecting from the radiator panel lower in a frontal direction of the vehicle body, wherein the radiator panel lower comprises:
- a radiator panel lower body extending in the width direction of the vehicle which has a closed cross-section having a front surface, a top surface, a rear surface, and a bottom surface, both ends of the radiator panel lower body being connected to the lower surfaces of the front ends of the right and left side frames, and
- mounting bases that are connected to both ends of the radiator panel lower body and the front ends of the right and left side frames; and the rear ends of the shock load input units are fixed to the front surface of the radiator panel lower body at positions offset inwardly, with respect to the widthwise direction of the vehicle, from the center axis of the side frame, each of the shock load input units being configured as a bracket in the form of a hollow column, the bracket comprising:
- an upper member having a front end, a top surface and side faces downwardly extending from folding lines at sides of the top surface, and
- a lower member having a front end, a rear end, sides, and a contact area upwardly extending from the front end, the rear end being fixed to the front surface of the radiator panel lower body, the sides of the lower member being connected to edges of the side faces of the upper member, the contact area being formed so as to cover the front end of the upper member.

4. The front vehicle body structure according to claim 1, wherein weak areas are formed in the vicinity of the front ends of the side frames.

5. The front vehicle body structure according to claim 2, wherein weak areas are formed in the vicinity of the front ends of the side frames.

6. The front vehicle body structure according to claim 3, wherein weak areas are formed in the vicinity of the front ends of the side frames.

7. The front vehicle body structure according to claim 1, wherein the leading ends of the shock load input units are configured as free ends.

8. The front vehicle body structure according to claim 1, wherein the shock load input units are hollow columnar members.

9. The front vehicle body structure according to claim 8, wherein each of the shock load input units comprises two separate members.

10. The front vehicle body structure according to claim 9, wherein the two separate members in each shock load input unit are an upper member and a lower member.

11. The front vehicle body structure according to claim 1, wherein each of the shock load input units comprises two separate members.

12. The front vehicle body structure according to claim 11, wherein the two separate members in each shock load input unit are an upper member and a lower member.

13. The front vehicle body structure according to claim 1, wherein the shock load input units comprise a resinous member.

14. The front vehicle body structure according to claim 4, wherein the weak areas are configured to facilitate a deformation of the side frames in an outward-folding manner.

15. The front vehicle body structure according to claim 5, wherein the weak areas are configured to facilitate a deformation of the side frames in an outward-folding manner.

16. The front vehicle body structure according to claim 6, wherein the weak areas are configured to facilitate a deformation of the side frames in an outward-folding manner.

17. The front vehicle body structure according to claim 1, wherein the shock load input units are configured to input to the radiator panel lower a shock load of sufficient value to deform the radiator lower panel.

18. The front vehicle body structure according to claim 17, wherein the shock load input units are configured to input a deforming shock load to the radiator lower panel in such a manner that the radiator lower panel will deform in an inward-folding manner.

19. The front vehicle body structure according to claim 18, wherein weak areas are formed in the vicinity of the front ends of the side frames, and the weak areas are configured to facilitate a deformation of the side frames in an outward-folding manner.

20. The front vehicle body structure according to claim 18, wherein weak areas are formed in the vicinity of the front ends of the side frames, the weak areas being configured to deform upon the generation of a moment load of sufficient value due to the radiator lower panel deforming in an inward-folding manner, and the weak areas being configured to deform in such a manner that the side frames deform in an outward-folding manner.

21. The front vehicle body structure according to claim 3, wherein the shock load input units are configured to input to the radiator panel lower a shock load of sufficient value to deform the radiator lower panel.

22. The front vehicle body structure according to claim 21, wherein the shock load input units are configured to input a deforming shock load to the radiator lower panel in such a manner that the radiator lower panel will deform in an inward-folding manner.

23. The front vehicle body structure according to claim 22, wherein weak areas are formed in the vicinity of the front ends of the side frames, and the weak areas are configured to facilitate a deformation of the side frames in an outward-folding manner.

24. The front vehicle body structure according to claim 22, wherein weak areas are formed in the vicinity of the front ends of the side frames, the weak areas being configured to deform upon the generation of a moment load of sufficient value due to the radiator lower panel deforming in an inward-folding manner, and the weak areas being configured to deform in such a manner that the side frames to deform in an outward-folding manner.

* * * * *